United States Patent [19]

Danneskiold-Samsoe

[11] Patent Number: 4,932,784
[45] Date of Patent: Jun. 12, 1990

[54] APPARATUS FOR TRACK-BASED DETECTION OF THE WHEEL PROFILE OF PASSING RAILWAY WHEELS

[75] Inventor: Ulrik Danneskiold-Samsoe, Copenhagen, Denmark

[73] Assignee: Caltronic A/S, Copenhagen, Denmark

[21] Appl. No.: 205,320
[22] PCT Filed: Oct. 9, 1987
[86] PCT No.: PCT/DK87/00122
§ 371 Date: Jun. 10, 1988
§ 102(e) Date: Jun. 10, 1988
[87] PCT Pub. No.: WO88/02713
PCT Pub. Date: Apr. 21, 1988

[30] Foreign Application Priority Data

Oct. 13, 1986 [DK] Denmark ............................. 4884/86

[51] Int. Cl.⁵ ........................ B61K 9/12; G01B 11/24
[52] U.S. Cl. .................................... 356/376; 250/560
[58] Field of Search ...................... 356/376; 250/560; 246/249

[56] References Cited

U.S. PATENT DOCUMENTS

| | | | |
|---|---|---|---|
| 4,155,526 | 5/1979 | Noble | 246/249 |
| 4,749,870 | 6/1988 | Schmalfuss et al. | 356/385 |
| 4,798,963 | 1/1989 | Wittkopp et al. | 356/385 |
| 4,798,964 | 1/1989 | Schmalfuss et al. | 356/376 |

Primary Examiner—Richard A. Rosenberger
Attorney, Agent, or Firm—Antonelli, Terry, Stout & Kraus

[57] ABSTRACT

An apparatus for track-based detection of the wheel profile (2,3) of passing railway wheels (1) when these are passing a measuring stretch comprises a measuring apparatus (5) with a generator (6) for laser light and a receiver (7) for reflected laser light from a reflection point (8). The measuring apparatus (5) has no movable parts in that the measuring is carried out along a relative to the wheel axle fixed but perhaps skew rectilinear base line (M) which is intersected by the wheel during the passing thereof whereby the wheel profile is scanned along an inclined path. The apparatus moreover measures the sideways position of the wheel on the rail and the travelling speed of the wheel and the deflection of the track (4). All measuring results are processed and compared with the measuring result from a measured reference profile of a perfect wheel whereby, for example, flange height, flange width and maximum deviation between measured value and reference value may be computed.

18 Claims, 5 Drawing Sheets

APPARATUS FOR TRACK-BASED DETECTION OF THE WHEEL PROFILE OF PASSING RAILWAY WHEELS

BACKGROUND OF THE INVENTION

The invention relates to an apparatus for track-based detection of the wheel profile of passing railway wheels when the wheels are passing a measuring area by the track.

Wear of flanges of railway wheels is a well-known phenomenon. The wear causes increased operating costs and reduced safety if the presence of the defect is not quickly established so that the carriage in question can be taken out of service and be repaired at a time appropriate to railway operations.

Usually, the presence of correct wheel profile or of wear of the tread or the flange is established by manual examination and inspection of the wheel treads. This is a diffcult examination procedure to control and there are also purely practical difficulties in mechanically measuring and checking the wheel profile.

Today maintenance of the wheels is generally not done on the basis of a conditional supervision but on statistical empiric data, the consequences being that some wheels with defects are not discovered and repaired once the defect occurs, whereas, many faultless wheels are subjected to unnecessary inspection. It is a fact, however, that wear of tread and flange may occur much faster than expected, for example, on account of deficient rail lubrication or following track repair work. It is very important that wheels with a worn tread and/or flange are quickly repaired when the defect occurs since such wheel defects may cause highly increased wear and perhaps destruction of switches etc. and the possibility of derailment by running in curves and switches is greatly increased.

German published specification No. 1,293,810 describes an apparatus for measuring the wheel profile of railway wheels. This apparatus, however, is intended for workshop use and requires dismantling of the wheel pairs which is cumbersome and costly and which is therefore only done in connection with repair and maintenance work. The apparatus cannot be used for measuring a profile on passing carriages since the apparatus requires the wheel pairs to be fixed in the measuring apparatus itself and it can therefore not at all be used for conditional supervision of the wheel profile of passing railway wheels.

U.S. Pat. No. 4,155,526 describes an apparatus for measuring on railway wheels which includes measuring of the flange height when the railway carriages pass a measuring area. The measurement is made by having a number of sensors detect the wheel when the same passes the measuring area and the obtained data are applied for computing the wheel diameter, the tread thickness and the flange height. By this known measuring method there are obtained fairly rough measurements and from these measuring results it is difficult to establish the degree of wear of a wheel since there are only obtained quite few measuring results from the wheel.

It is particularly difficult from the measuring results to say anything about the wheel flange thickness.

It is the object of the invention to provide an apparatus for track-based measuring of the wheel profile, including the flange thickness, of railway wheels of passing carriages whereby there is obtained a precise and accurate detection of the cross-sectional profile of the wheel tread as well as of its flange. The apparatus must therefore be capable of measuring or detecting the geometry precisely and automatically without in any way influencing on railway services.

The above object is achieved by providing an apparatus for track-based detection of a wheel profile of passing railway wheels when the wheels are passing a measuring area by the track, with the apparatus including at least one means for measuring a distance from at least one fixed point by electromagnetic waves to a number of reflection points on the wheel, with the measurement being carried out along at least one baseline. Means are provided for measuring an intermediate position of the passing wheels on the rail in a sidewise or transverse direction during an entire measuring operation over the measuring area, and data processing means, collect, convert, correct and store measured and computed data.

By virtue of the above-noted features of the present invention, a measuring apparatus is provided which has no movable parts since the measuring is carried out along a baseline or a number of baselines which are intersected by the wheel during the passing thereof so that it is simply the wheel itself which forms the movable part and provides detection across an outer profile of the railway wheel. When the baseline or baselines hit the wheel profile in desired places, the distance measurings are carried out and the electronic circuit of the apparatus converts the measuring results into digital values representing the wheel profile applying the measuring of the sideways or transverse position of the wheel as a correction value. Thus, what is obtained is an instantaneous measuring of the wheel profile at the measuring point.

If only one baseline is used, in accordance with further features of the present invention, the apparatus further includes means for measuring the traveling speed or the rate of rotation of the wheel. With such an arrangement, the point to which the distance is measured will move over the wheel profile along a curved path due to the motion of the wheel and the rate of speed of the train or the wheel will therefor have to be used for correcting the measuring results together with information on the direction of the baseline in that the measuring is made when the baseline detects the wheel profile. At the same time any side ways or transverse movement of the wheel must be compensated, and all measuring and correction data must be immediately processed or stored for later processing, with the result being either in the nature of signals corresponding to the wheel profile or signals representing characteristics coefficients stored in the data processor.

In order to enable a measuring operation under optimum conditions and to enable a placement of the measuring apparatus substantially in the track level where it is not affected by protruding parts on the railway carriages, according to further features of the present invention, the baseline is skewed relative to the axle of the wheel of the passing railway wheels.

If the track is yielding, the extent of the deflection depends upon a weight and load of the carriage, and means may be provided for measuring a depression in a vertical direction of the track caused by the weight of the train, whereby it is possible to make precise measurements without the need for supporting the track on the measuring area which is a very difficult and costly task.

By providing a measuring transducer such as, for example, a displacement transducer or like transducer sensitive to motion, a measurement of the distance between the rail base and the frame on which the distance measuring apparatus may be obtained, whereby a deflection in a vertical direction by the passage of the carriage is measured in a simple manner.

In order to enable a comparing of measuring data with the carriage number in such a manner that all data sets are, for example, provided with carriage number and, perhaps, a wheel number, in accordance with the present invention, a wireless carriage identification system may be connected to the data processing means in such a manner that the measuring signals are given a carriage identification signal. A carriage identification signal may be made with a common carriage identification system such as a generally known microwave based system with an antenna placed by the measuring area so that all carriage numbers will have been read when the last carriage leaves the measuring area. The carriage identification system by being connected to the data processor provides data sets with carriage number and, optionally, wheel identification.

The measuring apparatus of the present invention is preferably based upon the use of a laser light and, particularly, post-modulated infra-red laser light, with a receiver means being provided for the reflective laser light from the reflection points and a measuring means for the detection of the reflected laser light. By such an arrangement, it is possible with simple means to focus the light and to obtain a very small and accurate reflection point providing a highly accurate measuring. Such an apparatus may, for example, detect the wheel profile with an accuracy of at least $+/-0.1$ mm, which is considerably more accurate than necessary.

In order to quickly ascertain whether the wheel profile is within the acceptable tolerances or the wheel requires immediate repair, in accordance with the present invention, further data processing means may be provided for comparing detected wheel profile signals with storage signals corresponding to a correct wheel profile and for comparing characteristic values computed from the detected wheel profile signal with normal values. On the basis of the comparison with the normal values, it is also possible to compute for how long it will be safe to continue using the wheel before instituting any repair work. Furthermore, it is possible to compute how much material will have to be turned off each individual wheel to regain a correct wheel profile.

The measured wheel profiles may be approached by a higher degree polynomial, such as, for example, an eighth degree polynomial by the method of least squares thereby providing suppression of the inevitable noise signals with which the laser light signal is encumbered. It is sufficient to store the computed coefficients which, when the train has passed, are transmitted to the data processor monitoring the wheel maintenance. The wheel profile may be re-stored therein on the basis of the coefficients, and characteristic values such as, for example, flange height, flange width and the maximum deviation between the measured profile and measured reference profile of a perfect wheel may be computed.

In order to enable the apparatus to know precisely when wheels are on the measuring area to be measured and when no train is present in such measuring area, in accordance with further features of the present invention, means are provided for detecting when the train enters the measuring area and detecting when the last carriage leaves such measuring area. The space of time between the trains may be used for transmitting measuring data to a central data base for wheel maintenance and, possibly, for carrying out some additional calculation work if, due to the speed of the train, this cannot be done simultaneously with or immediately after a measuring on the wheel and before the next wheel travels into the measuring area.

The detecting means for detecting when the train enters the measuring area may, for example, be constituted by the measuring apparatus itself, whereby the apparatus is simplified and the ascertainment of whether there is a train in the measuring area or not is performed purely by a program in the apparatus.

The above and other objects, features, and advantages of the present invention will become more apparent from the following description when taken in connection with the accompanying drawings which show, for the purpose of illustration only, several embodiments in accordance with the present invention.

FIG. 1 shows a wheel profile of a perfect wheel,
FIG. 2 shows a wheel profile of a worn wheel,
FIG. 3 shows the measuring principle of the apparatus according to a first embodiment of the invention,
FIG. 4 shows the same as FIG. 3 but seen straight from above and with an additional measuring means,
FIG. 5 shows the same as FIG. 3 but seen straight from the side and with a measuring means for deflection,
FIG. 6 schematically shows the operation of the optical/electronical distance measuring,
FIG. 7 shows a graph of the distance measuring as a function of the time,
FIG. 8 shows a block diagram in greater detail of the complete apparatus according to the invention, and
FIG. 9 shows the measuring principle of the apparatus according to another embodiment of the invention.

DETAILED DESCRIPTION

Figure 1:
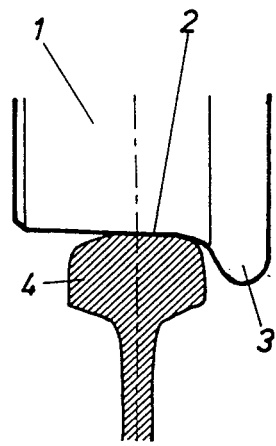

FIG. 1 of the drawing shows a flanged wheel 1 in the form of a railway wheel travelling on a rail 4. The wheel has a tread 2 and a flange 3 with a cross-sectional profile corresponding to the norm of a perfect railway wheel.

Figure 2:
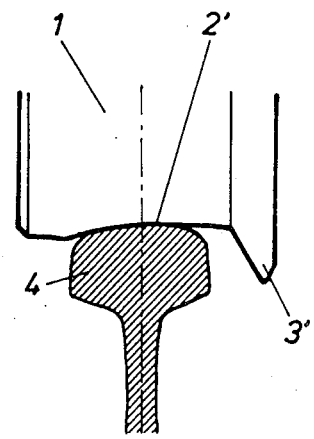

After running several thousand kilometers, the tread 2 and the side of the flange 3 facing the tread will wear thereby producing the tread 2' and the profile of the flange 3' as shown in FIG. 2.

Figure 3:
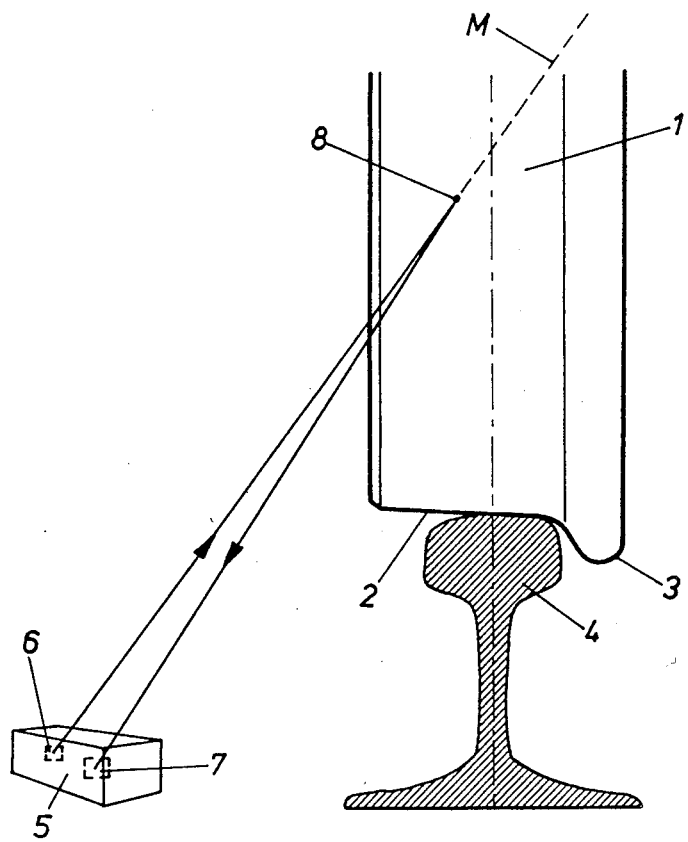

FIG. 3 of the drawing shows a laser light distance measuring apparatus 5 with a modulated, infrared laser light source 6 and a receiver 7 for reflected laser light from a reflection point 8 along a base line M. The direction of the base line M is fixed and intersects the wheel plane in such a manner that the reflection point 8 will take a curved path. The distance from the reflection point 8 to the laser light receiver 7 is measured continuously and will be explained further in connection with FIGS. 6 and 7.

Figure 4:
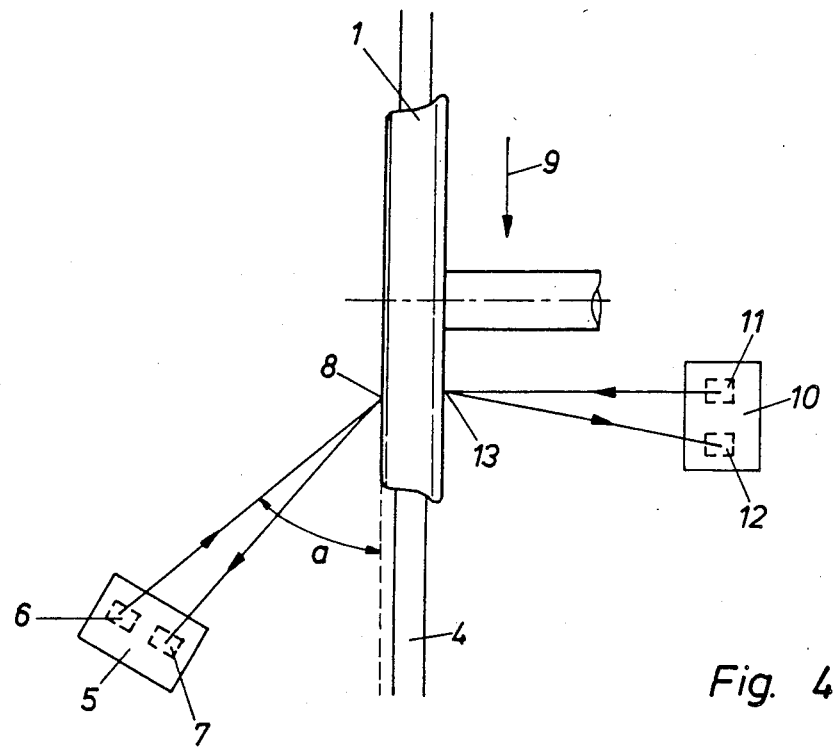
Figure 5:
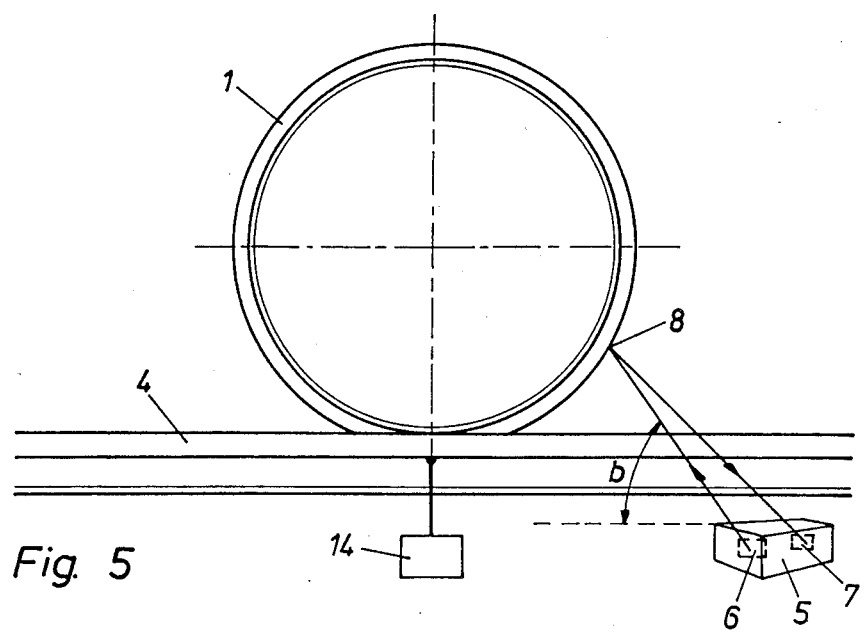

FIG. 4 shows the same as FIG. 3 but viewed from above in that a further distance measuring means 10, preferably of the same kind as the measuring apparatus 5, is continously measuring the distance to the side of the wheel, namely, to a reflection point 13, thereby obtaining a correction signal for the sideways location of the wheel. FIG. 5 shows a further measuring means 14 being a displacement transducer which measures the deflection of the track and thereby the displacement of the wheel in vertical direction relative to the frame or the base on which the measuring means 5 and the measuring means 10 are arranged.

Knowing angle a in FIG. 4 and angle b in FIG. 5, the speed of the wheel in the direction of travel 9 and the sideways position of the wheel measured by the measuring means 10, and the deflection of the rail measured by the measuring means 14, the distance measurings measured by the measuring means 5 may be corrected thereby obtaining an electric signal corresponding exactly to the cross-sectional profile of the wheel in radial direction. Angle a may, for example, be 61.2° and angle b may, for example, be 36.7°.

Figure 6:
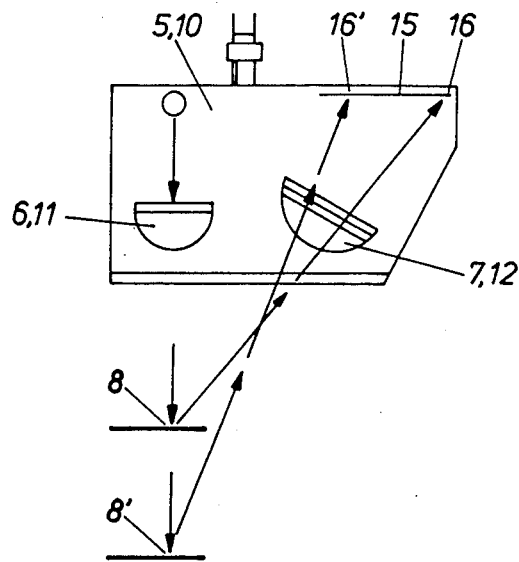

The distance measuring means 5 is shown in FIG. 6 and may be a generally known measuring apparatus such as Optocator model 2005, and the distance measuring means 10 may also be a known measuring means such as Optocator model 2203, both manufactured by SELCOM AB, Sweden. The distance measuring means includes an infrared laser diode with focusing optics 6, 11 emitting laser light either continuously or pulse modulated, for example pulse modulated by 16 kHz. The size of the measuring area within which measuring takes place is 20–25 cm. The receiver 7, 12 includes an optical focusing system for reflected light from the reflection point 8, 8' and an elongate, light sensitive detector 15 on which the reflection point 8 or 8' is positionally detected for the measuring points 16 or 16'.

Figure 7:
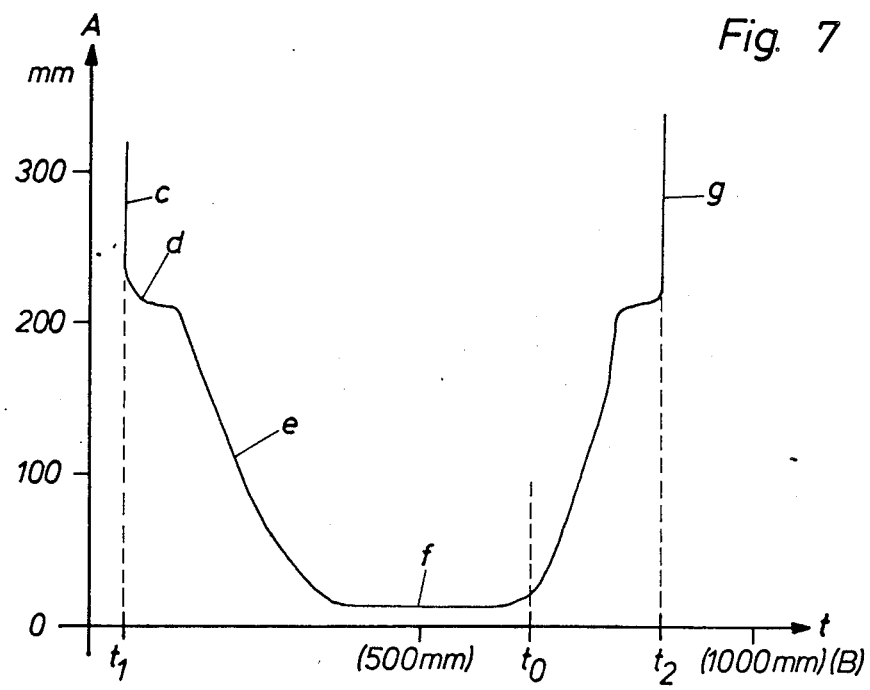

FIG. 7 of the drawing shows a graph K representing a distance measurement A in mm as a function of the time t of a passing railway wheel in that the graph section c corresponds to the distance (infinite) until the time $t_1$ when the top of the wheel flange hits the base line M. Graph section d corresponds to detection along the inner side of the wheel flange, and graph section e corresponds to detection across the tread. The graph section f, constant distance, corresponds to measuring on the substantially plane face of the wheel till the time $t_0$ from when the graph section g and the time $t_2$ correspond to the wheel having finally passed the measuring area in that the measuring apparatus 5 again measures the distance as infinite. The interesting measuring course is therefore between the times $t_1$ and $t_0$ in that the area between $t_0$ and $t_2$ is uninteresting and is not used by the further computations of the wheel profile. The times $t_1$ and $t_2$ or the difference between them may be used for determining the speed of the train or the wheel and for example for measuring the wheel diameter when the upper position of the reflection point 8 on the wheel is known corresponding to the two times. The time axis has also been divided into measures of length so that it is possible to read the thickness of the wheel flange.

Figure 8:
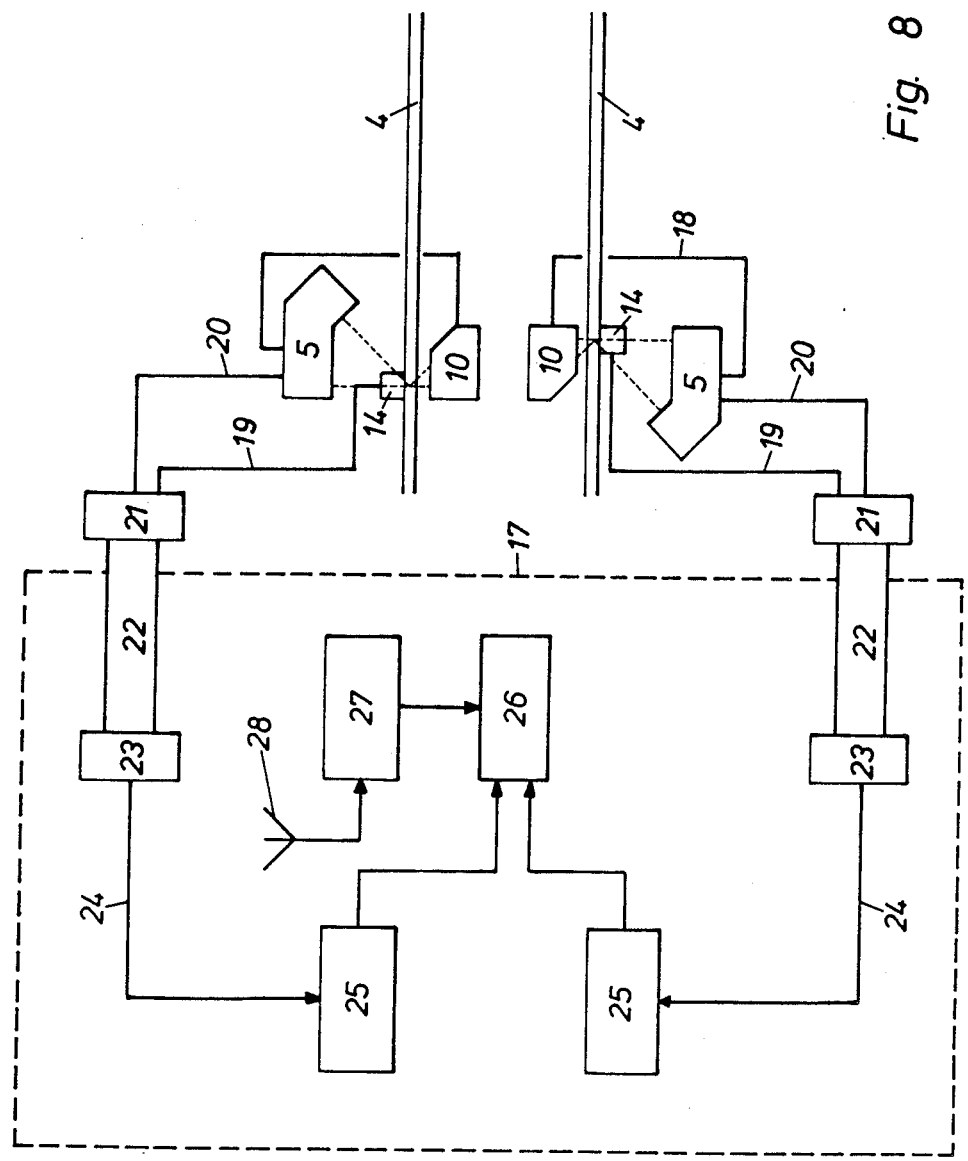

FIG. 8 shows a top view of a track 4 having two measuring stations, one by each rail, and comprising a distance measuring apparatus 5, a correction measuring apparatus 10 and a measuring transducer 14 for measuring rail deflection in that the measuring apparatuses 5 and 10 are electrically connected via the wires 18 and where the measuring apparatus as a whole via conductors 19 and 20 and adapter circuits 21 and transmission lines 22 is connected to a computation and data processing equipment 17 to which there is also connected a usual microwave based carriage identification system comprising an antenna 28 and a receiver/transmitter 27 identifying passing railway carriages by means of a transponder arranged in each carriage, said transponder giving a carriage identification signal. The carriage identification system 27, 28 is connected to the central computer 26 in the data processing equipment 17.

The transmission lines 22 may have a suitable length, for example, 200–300 m, so that the data processing equipment may be placed at a suitable distance from the railway track, for example, within a building near by where it is not exposed to vibrations, climatic influences, electrical fields and the like.

The measuring signals are received by adaptor circuits 23 positioned at the end of the transmission lines 22 and transmitted to each its computation unit comprising signal processors and storages processing the received signals according to input data programs and storing for each wheel relevant, processed data, for example the coefficients of a higher degree polynomial, for example, of 8th degree corresponding to the profile of the detected wheel.

Synchronously with the measurings or when the train has passed, the stored data are transmitted to the connected computer 26, e.g. a DIGITAL PDP 11 computer where the characteristic data of each wheel are provided with carriage identification signals and/or wheel identification signals and where these data sets are stored and compared with stored data from a measured reference profile on a perfect wheel.

On the basis of these comparative measurements it will be decided whether the carriage in question is to be repaired or the wheel turned at once or later on and perhaps how much material is to be turned off each individual wheel. The speed of the train or the rate of rotation of the wheels is computed from the measuring times $t_1$ and $t_2$, see FIG. 7, or by means of separate inductive sensors which in the usual manner have been placed by the track and connected to the data processing equipment 17.

The carriage identification system 27, 28, may, for example, be a type PREMID by Phillips; the distance measuring apparatus 5, 21, 23 complete with circuits may be, for example, Selcom, type 2005 from Selcom AB Sweden; the distance measuring apparatus 10, 21, 23, complete with circuits may be, for example, of the Selcom type 2203 from Selcom AB Sweden, the measuring transducer 14 complete with amplifier may, for example, be type LDT5L-UCA5B, H. F. Jensen, Denmark, the calculator unit may, for example, be of a type SPB1 signal processing card, signal-data, Denmark; and, the computer 26 may, for example, be model micro-PDP 11/23, Digital Equipment Corporation, United States.

Where such a measuring apparatus is used for example on an urban railway line, it may without problems measure on passing wheels running at rates between 30 and 100 km/h with an accuracy of measurement of the order of 0.1 mm. The lower limit of the passing speed will be determined by the storage capacity in the calculator unit 25 and of the sampling frequency.

Figure 9:
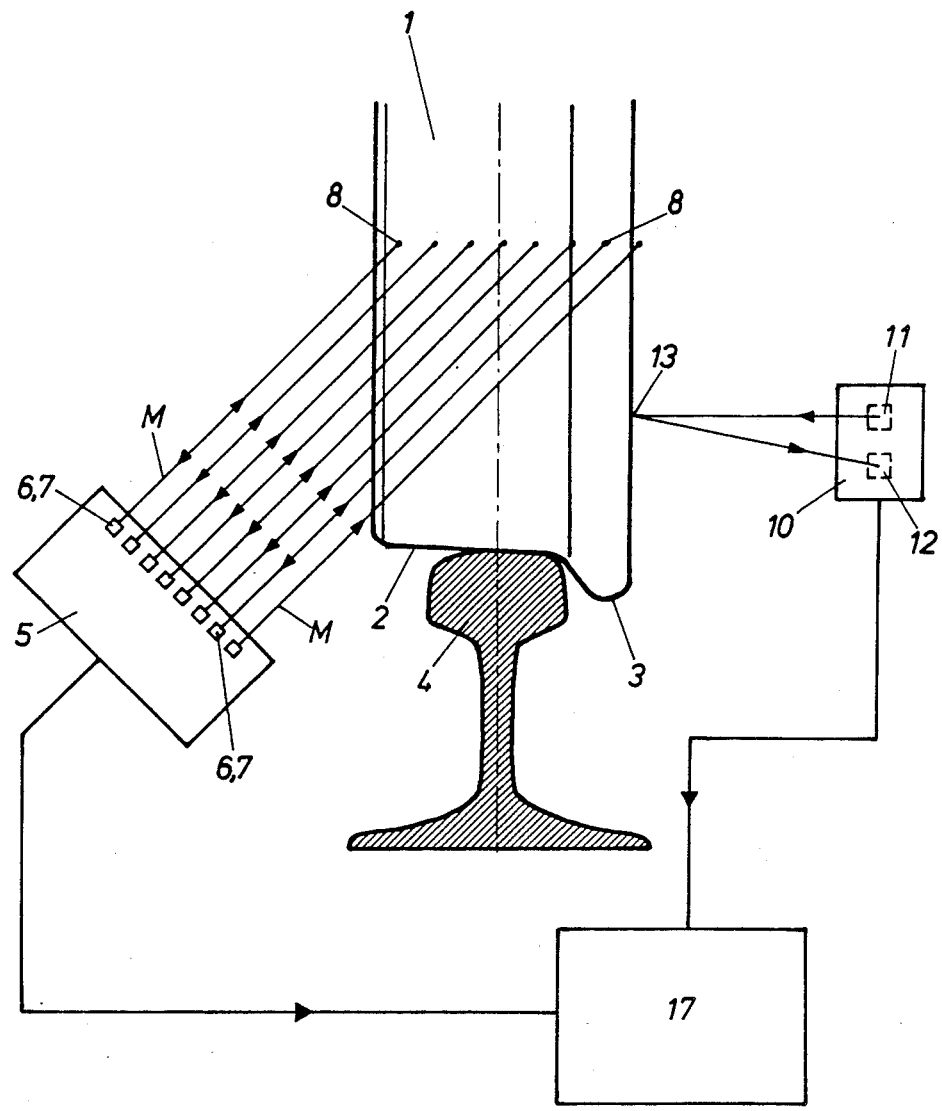

FIG. 9 shows another embodiment of the apparatus according to the invention which is characteristic in that all measurements are instantaneous measurements so that there is no need for knowing or measuring the travelling or rotational speed of the wheel. Using a number of laser light senders 6 and receivers 7 the wheel profile is detected at a time via a number of reflection points 8 distributed across the profile width. The measuring lines M are preferably parallel and interference between neighbouring rays is avoided by a suitable choice of frequency or a suitable pulse modulation of the laser light in the individual generators 6. The distance measuring apparatus 5 will then in cooperation with suitable data processing circuits 17 which as explained above also receive information on the sideways position of the wheel 1 from a distance measuring means 10 capable of immediately detecting the wheel profile with sufficient accuracy. The accuracy depends on how close the reflection points 8 are placed next to each other, i.e. the number of senders/receivers 6, 7 used. It is obvious that this embodiment is more costly than the former since a number, for example 5–15 laser light distance measuring apparatuses are required. On the other hand it is not necessary to make corrections relative to the wheel speed and in case the rail deflection is not very great, it is not necessary either to make corrections therefor if the apparatus is set so that the measuring lines M hit the wheel profile at a suitable angle.

I claim:

1. Apparatus for a track-based detection of a wheel profile of railway wheels passing a measuring area along a railway comprising:
   at least one first measuring means for continuously measuring a distance from at least one fixed point to at least one point on the wheel along at least one rectilinear baseline fixed with respect to an axle of the wheel,
   second measuring means for continuously measuring an intermediate position of the passing wheel in a direction transverse to the wheel during an entire measuring operation through the measuring area, and
   data processing means for collecting, converting, correcting and storing measured data based on measurements obtained from the first and second measuring means and computed data.

2. Apparatus according to claim 1, wherein said first measuring means measures a distance by electromagnetic waves.

3. Apparatus according to claim 1, wherein, when only one first means is used for measuring the distance along a baseline, the apparatus further comprises means for measuring a traveling speed or a traveling speed or a rate of rotation of the wheel.

4. Apparatus according to claim 3, wherein the at least rectilinear baseline is skewed relative to the axle of the passing wheel.

5. Apparatus according to one of claims 1, 3 or 4, further comprising means for measuring a depression in vertical direction of the track caused by weight of a train supported by the railway wheels.

6. Apparatus according to claim 5, wherein said means for measuring a depression comprise a measuring transducer means for a displacement transducer or the like transducer sensitive to measuring a distance between a rail base and a frame on which the at least one of the first and second measuring means is mounted.

7. Apparatus according to claim 6, further comprising wireless carriage identification means connected to the data processing means for identifying a carriage and providing a carriage identification signal two measurement signals from at least one of the first and second measuring means.

8. Apparatus according to claim 7, wherein said first measuring means includes generator means for generating laser light, receiver means for receiving reflected laser light from the at least one point, and measuring means for detection of reflected laser light received by the receiver means.

9. Apparatus according to claim 8, further comprising additional data processing means for comparing detected wheel profile signals with stored signals corresponding to a correct wheel profile and for comparing characteristic values computed from the detected wheel profile signal with norm values for a wheel profile.

10. Apparatus according to claim 9, further comprising means for detecting when a train enters the measuring area and for detecting when a last carriage of the train leaves the measuring area.

11. Apparatus according to claim 10, wherein the means for detecting are constituted by said first measuring means.

12. Apparatus according to claim 6, wherein said transducer means includes a displacement transducer sensitive to motion.

13. Apparatus according to one of claims 1, 3, or 4, further comprising wireless carriage identification means connected to the data processing means for identifying a carriage and providing a carriage identification signal to measurement signals from at least one of the first and second measuring means.

14. Apparatus according to claim 13, wherein said first measuring means includes generator means for generating laser light, receiver means for receiving reflected laser light from the at least one point, and measuring means for detection of reflected laser light received by the receiver means.

15. Apparatus according to claim 14, further comprising additional data processing means for comparing detected wheel profile signals with stored signals corresponding to a correct wheel profile and for comparing characteristic values computed from the detected wheel profile signal with norm values for a wheel profile.

16. Apparatus according to claim 15, further comprising means for detecting when a train enters the measuring area and for detecting when a last carriage of the train leaves the measuring area.

17. Apparatus according to one of claims 1, 3, or 4, further comprising additional data processing means for comparing detected wheel profile signals with stored signals corresponding to a correct wheel profile and for comparing characteristic values computed from the detected wheel profile signal with norm values for a wheel profile.

18. Apparatus according to claim 17, further comprising means for detecting when a train enters the measuring area and for detecting when a last carriage of the train leaves the measuring area.

* * * * *